United States Patent
Zhang et al.

(10) Patent No.: US 11,269,611 B2
(45) Date of Patent: Mar. 8, 2022

(54) DATA INTERFACE PROCESSING METHOD, DEVICE, SERVER AND MEDIUM

(71) Applicant: BEIJING INTERNETWARE LIMITED COMPANY, Beijing (CN)

(72) Inventors: Ying Zhang, Beijing (CN); Zhen Huang, Beijing (CN); Xing Su, Beijing (CN); Gang Huang, Beijing (CN); Wei Yao, Beijing (CN)

(73) Assignee: BEIJING INTERNETWARE LIMITED COMPANY, Beijing (CN)

( * ) Notice: Subject to any disclaimer, the term of this patent is extended or adjusted under 35 U.S.C. 154(b) by 92 days.

(21) Appl. No.: 16/314,138

(22) PCT Filed: Apr. 12, 2018

(86) PCT No.: PCT/CN2018/082820
§ 371 (c)(1),
(2) Date: Dec. 28, 2018

(87) PCT Pub. No.: WO2019/056740
PCT Pub. Date: Mar. 28, 2019

(65) Prior Publication Data
US 2021/0224055 A1    Jul. 22, 2021

(30) Foreign Application Priority Data
Sep. 25, 2017    (CN) .......................... 201710875661.2

(51) Int. Cl.
*G06F 8/65* (2018.01)
*G06F 9/54* (2006.01)
(52) U.S. Cl.
CPC ............... *G06F 8/65* (2013.01); *G06F 9/541* (2013.01)

(58) Field of Classification Search
CPC .................................. G06F 8/65; G06F 9/541
See application file for complete search history.

(56) References Cited

U.S. PATENT DOCUMENTS

| | | |
|---|---|---|
| 2002/0165701 A1 | 11/2002 | Lichtenberg et al. |
| 2016/0085544 A1 | 3/2016 | Sharma et al. |

(Continued)

FOREIGN PATENT DOCUMENTS

| | | |
|---|---|---|
| CN | 101477457 | 7/2009 |
| CN | 106815007 | 6/2017 |

(Continued)

OTHER PUBLICATIONS

International Search Report from PCT/CN2018/082820, dated Jun. 22, 2018.

*Primary Examiner* — S. Sough
*Assistant Examiner* — Cheneca Smith
(74) *Attorney, Agent, or Firm* — Morse, Barnes-Brown & Pendleton, P.C.; Sean D. Detweiler, Esq.

(57) ABSTRACT

A data interface processing method, device, server and medium are disclosed. The method includes: loading a configuration file when installing the user application, where the configuration file includes a configuration file of a combination relationship between at least one third-party application programming interface and at least one connector, and the connector is used to implement different data conversions between the third-party application programming interfaces. The combination relationship is set according to the requirements of the user application; obtaining, through the user application, user inputs as input parameters; converting, by the user application, the input parameters according to the combination relationship defined in the configuration file and outputting the converted input parameters.

15 Claims, 3 Drawing Sheets

(56) References Cited

U.S. PATENT DOCUMENTS

2016/0301739 A1* 10/2016 Thompson .............. G06F 9/547
2018/0232262 A1*  8/2018 Chowdhury .......... G06F 16/252
2018/0278471 A1*  9/2018 Burli ........................ G06F 8/31

FOREIGN PATENT DOCUMENTS

| CN | 106874181 | 6/2017 |
| CN | 107577629 | 1/2018 |

* cited by examiner

… (1)

DATA INTERFACE PROCESSING METHOD, DEVICE, SERVER AND MEDIUM

RELATED APPLICATIONS

This application is a national stage application under 35 U.S.C. 371 based on international patent application PCT/CN2018/082820, filed on Apr. 12, 2018 which claims priority to Chinese patent application No. CN201710875661.2 filed on Sep. 25, 2017, disclosures of both of which are incorporated herein by reference in their entireties.

TECHNICAL FIELD

The present disclosure relates to data processing technology, and for example, to a data interface processing method, device, server and medium.

BACKGROUND

With the rise of the Internet and cloud computing, data interface, also known as Web API (Application Programming Interface), has become more and more used and concerned. Amazon, Google and Twitter have all begun to provide services through Web APIs. So are the Chinese Internet companies: WeChat, Taobao and Alipay have already been integrated with multiple third-party APIs; Baidu has provided its core business functions in Baidu Map through Web APIs, and there are a lot of high-quality third-party APIs hosted in Baidu API Store. It can be said that API economy has become the current hot spot and trend.

Currently, user requirements are generally achieved by directly calling a third-party API. Despite the variety of Web APIs, the inventor found that there still exist the situations that the services provided by third-party APIs cannot directly satisfy the individualized needs of the users.

SUMMARY

The disclosure provides a data interface processing method, device, server and medium, so as to solve the problem in the related art that the services provided by third-party APIs cannot directly satisfy the personalized requirements of the users.

For example, in the first case, a name variable is named "name" in a third-party application, but in the user's program, the name variable is named "xingming", so the user cannot directly call the third-party API; in the second case, there are still some individual requirements that need to be achieved through integrating data and functions provided by multiple third-party APIs.

The embodiment of the present disclosure provides a data interface processing method, which includes:

loading the configuration file when the user application is installed, which includes a combination relationship between at least one third-party Application Programming Interface (API) and at least one connector, where the connector is used to implement the data conversion between a plurality of third-party APIs and the combination relationship is set according to the requirements of the user application;

obtaining, through the user application, the user input as input parameters; and converting by the user application, the input parameters according to the combination relationship defined in the configuration file and outputting the converted input parameters.

Optionally, after loading the configuration file, the method also includes:

obtaining the combination relationship from the configuration file;

constructing a directed acyclic graph according to the combination relationship, using each of the third-party APIs or the connectors as a single node;

determining whether the combination relationship between the third-party APIs and the connectors in the directed acyclic graph satisfies a preset rule.

Optionally, converting by the user application the input parameters according to the combination relationship defined in the configuration file and outputting the converted input parameters, includes:

if the combination relationship between the third-party application programming interface and the connector in the directed acyclic graph satisfies the preset rule, and user input parameters are obtained by the user application, using the user input parameters as the input parameters, and executing each node in the directed acyclic graph in order according to the directed acyclic graph.

Optionally, executing each node in the directed acyclic graph according to the directed acyclic graph sequentially includes:

traversing the directed acyclic graph, starting from the input node, determining the successor nodes of the input node as the current node in sequence, determining whether the current node is the third-party application programming interface, or the connector, where the input node is used to check the format of the input parameters;

if it is determined that the current node is a third-party API, then determining, according to the definition of the third-party API's input format in the configuration file, whether the input parameters meet the requirements, and if the inputs meet the requirements, invoking the third-party API using the input parameters, and obtaining the response as the output result of the current node, which is then used as the input parameters of the successor node, and then continuing the execution to the successor node;

if it is determined that the current node is a connector, determine, according to the definition of the input format of the connector in the configuration file, whether the input parameters meet the requirements, and if the input parameters satisfy the requirements, perform data conversion on the input parameters, according to the data conversion rules defined in the connector, and the converted data is the output result of the current node, which is then used as the successor node's input parameters, and then continuing the execution to the successor node.

Optionally, after determining whether the current node is a third-party API or a connector, the method further includes:

determining whether the current node is an output node, and if the current node is an output node, performing data processing on the input parameters according to the definition of the output node, and using the processed data as the result of the output node.

Optionally, the preset rule includes at least one of the following:

the third-party APIs are connected by a connector in between; and, the directed acyclic graph begins with an input node, and ends with an output node; and, the input node and the output node are directly connected to a single third-party API, or they are connected to a plurality of the third-party APIs through a connector; and, the connector is connected to the input node or the output node, and two ones of the connector are not directly connected. Optionally, before the loading the configuration file, the method also includes:

determining at least one third party API according to the requirements;

determining at least one connector according to at least one of the following: a difference in data format between the third-party APIs, and between the requirements; and taking the connection relationship between the third-party APIs and the connectors as the combined relationship.

The embodiment of the disclosure further provides a data interface processing device, which includes:

a loading module, configured to load the configuration file when the user application is installed, which includes at least one third-party API and at least one connector, where the connector is used to implement data conversion between multiple third-party APIs and the combination relationship is set according to requirements of the user application;

an execution module, configured to obtain, by the user application, user inputs as input parameters; where the user application converts the input parameters according to a combination relationship defined in the configuration file and outputs the converted input parameters.

The embodiment of the present disclosure further provides a server, which includes:

one or more processors;

a storage device for storing one or more programs, where when executed by the one or more processors, the one or more programs cause the one or more processors to perform the data interface processing method as described above.

The embodiment of the disclosure further provides a computer storage medium on which computer program are stored, which performs the data interface processing method described above when executed by processors.

The embodiment of the present disclosure loads the configuration file which contains the combination relationship between at least one third-party API and at least one connector, and acquires user inputs as the input parameters; the user application converts the input parameters, according to the combination relationship defined in the configuration file, to meet the personalized requirements of the user application, where the combination relationship is set according to the requirements of the user application. At the same time, at least one third-party API's being invoked avoids the developer's re-development of the corresponding function of the third-party API, which reduces development cost and improves development efficiency.

DETAILED DESCRIPTION

Figure 1:
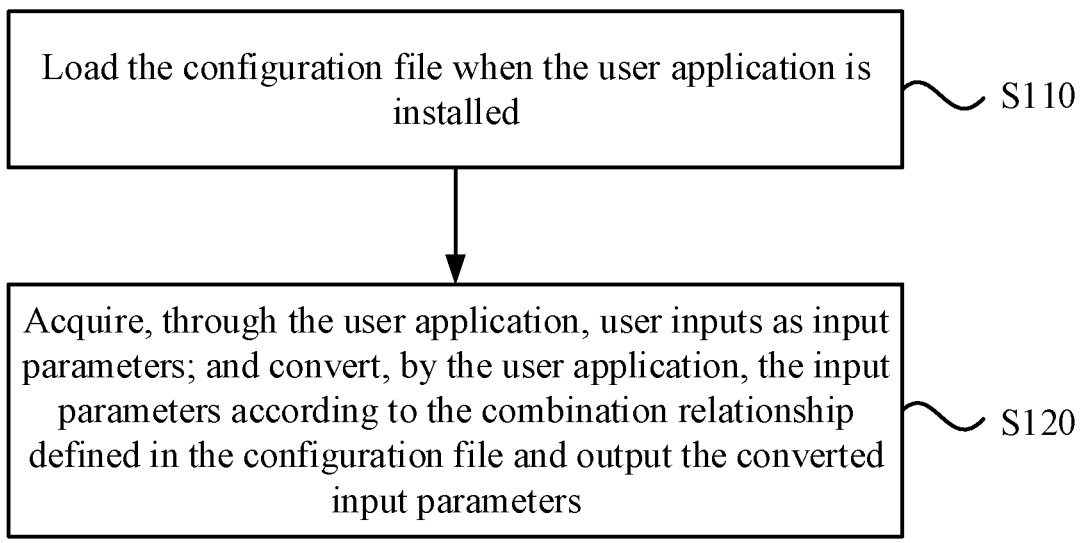
FIG. 1 is a flowchart of a data interface processing method according to an embodiment.

FIG. 1 is a flowchart of the data interface processing method provided by an embodiment of the present disclosure. This embodiment can be applied to the case that the current third-party API cannot fulfil the user's personalized requirements. The method can be performed by a data interface processing device, which can be implemented through software or hardware method. For example, the device can be configured on a server, and the method can be executed by the server in the background. Referring to FIG. 1, the data interface processing method provided by an embodiment of the present disclosure includes:

In S110, a configuration file is loaded when a user application is installed.

The configuration file includes a combination relationship between at least one third-party API and at least one connector, where the connector can be used to implement data conversion between different third-party APIs, and the combination relationship can be set based on the requirements of the user application. The user application can be an application that implements a personalized function, which can be determined by the combination relationship.

Optionally, before loading the configuration file that includes the combination relationship between at least one third-party API and at least one connector, the method further includes:

determining at least one third-party API according to the requirements;

determining at least one connector according to at least one of the following: a difference in data format between the third party APIs, and between the requirements;

the connection relationship between the third-party APIs and the connectors is taken as the combination relationship.

In an embodiment, for the case where the name variable is named "name" in the third-party API, but in the user application, the name variable is named "xingming", the above combination relationship may be a third-party API mentioned above and a connector, where the connector is used for the data conversion between "name" and "xingming".

In an embodiment, for certain personality requirements, which require to integrate data and functions provided by multiple third-party APIs, for example, the personality requirement is English weather, then the corresponding combination relationship may be the first connector, the weather API, the second connector, the Chinese-English translation API, and the third connector. The first connector can be configured to convert the data format of the inputs into the data format applicable to the weather API; the second connector may be configured to convert the weather API's output to the data format applicable to the Chinese-English translation API; the third connector can be used to convert the translation result to the data suitable for the user application.

Optionally, through the combination relationship, the effect can be achieved that the combination relationship can be regarded as a whole to be a third-party API, which has the function of outputting weather information in English. Optionally, in order to implement more complex requirements, the API may also be reorganized into a combination relationship. Therefore, when the developer develops the user application, the corresponding combination relationship can be directly invoked, and the corresponding personalized requirement can be realized, thereby avoiding the re-development for realizing the individualized requirement.

In an embodiment, in order to facilitate direct invocation or combination of the combination relationship corresponding to the same requirement, for example, after determining the combination relationship, the combination relationship can be stored for later use.

In S120, after acquiring the input parameters, the user application converts and outputs input parameter according to the combination relationship defined in the configuration file.

In an embodiment, if there is no such combination relationship, the developer of the user application needs to re-develop according to the corresponding requirements; the more complicated the combination relationship is, the more expensive the re-development cost is. Therefore, the embodiment of the present disclosure can save the development cost by calling the combination relationship.

In an embodiment, the process of converting the input parameters according to the combination relationship defined in the configuration file can be: calling at least one third-party API in the configuration file, processing the input parameters, returning data, and converting and outputting the result.

The embodiment of the present data interface processing method loads a configuration file which contains the combination relationship between at least one third-party API and at least one connector, and the user application calls at least one third-party API, according to the combination relationship defined in the configuration file, to meet the personalized requirements of the user application. The combination relationship is set according to the requirements of the user application. At the same time, at least one third-party API's being invoked avoids the developer's re-development of the corresponding function of the third-party API, which reduces development cost and improves development efficiency.

Figure 2:
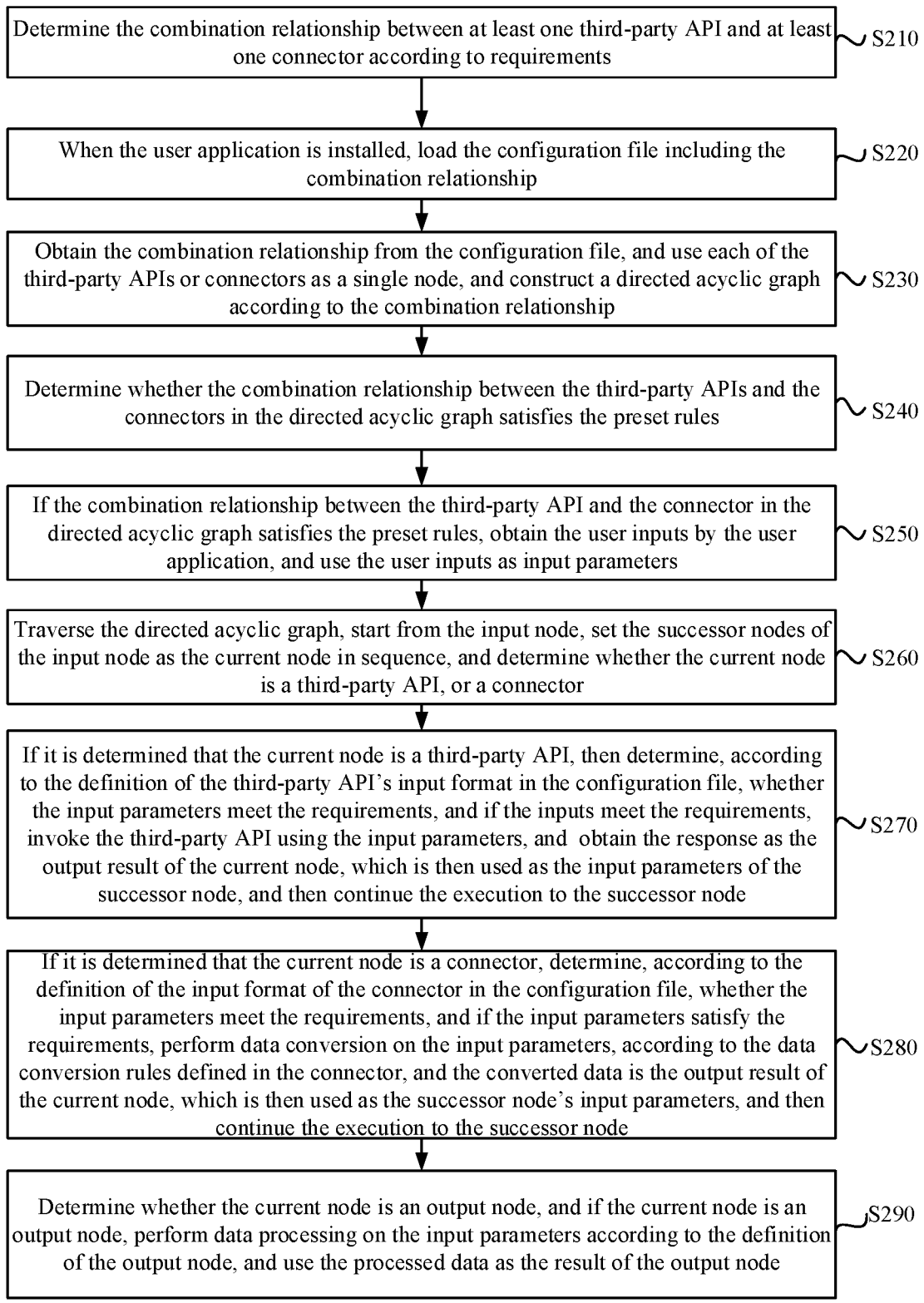
FIG. 2 is a flowchart of a data interface processing method according to another embodiment.

FIG. 2 is a flowchart of the data interface processing method provided by an embodiment of the present disclosure. Referring to FIG. 2, the data interface processing method provided in this embodiment includes:

In S210, the combination relationship between at least one third-party API and at least one connector is determined according to requirements.

In S220, when the user application is installed, the configuration file including the combination relationship is loaded.

In S230, the combination relationship is obtained from the configuration file, and each of the third-party APIs or connectors are used as a single node, and a directed acyclic graph is constructed according to the combination relationship.

In S240, whether the combination relationship between the third-party APIs and the connectors in the directed acyclic graph satisfies a preset rule is determined.

The determination of the preset rule may confirm the accuracy of the combination relationship between the third-party APIs and the connectors.

Optionally, the preset rule includes at least one of the following:

the third-party APIs are connected by a connector; and, the directed acyclic graph begins with the input node, and ends with the output node; and, the input node and the output node are directly connected to a single third-party API, or a plurality of the third-party APIs through a connector; and, the connector is connected to the input node or the output node, and two connectors are not directly connected.

In S250, if the combination relationship between the third-party API and the connector in the directed acyclic graph satisfies the preset rules, and the user inputs are obtained by the user application, the user inputs are used as input parameters.

In S260, the directed acyclic graph, starting from the input node is traversed, the successor nodes of the input node as the current node in sequence is set, and whether the current node is the third-party API or the connector is determined.

The input node may be used for at least one of the following functions: checking the format of the input parameters, and performing data format conversion on the input parameters, so that the input parameters are applicable to the third-party API which is dependent on the input node.

In S270, if it is determined that the current node is a third-party API, whether the input parameters meet the requirements is determined according to the definition of the third-party API's input format in the configuration file, and if the inputs meet the requirements, the third-party API is invoked using the input parameters, and the response is obtained as the output result of the current node, which is then used as the input parameters of the successor node, and then the execution continues to the successor node.

In an embodiment, determining whether the acquired input parameters meet the requirements may include determining whether the data format of the obtained input parameters satisfy the required format, and if not, giving an error prompt.

In S280, if it is determined that the current node is a connector, whether the input parameters meet the requirements is determined according to the definition of the input format of the connector in the configuration file, and if the input parameters satisfy the requirements, data conversion on the input parameters is performed according to the data conversion rules defined in the connector, and the converted data is the output result of the current node, which is then used as the successor node's input parameters, and then the execution continues to a successor node.

In an embodiment, determining whether the acquired input parameters meet the requirements may include determining whether the data format of the obtained input parameters satisfy the required format, and if not, giving an error prompt.

In S290, whether the current node is an output node is determined, and if the current node is an output node, data processing on the input parameters is performed according to the definition of the output node, and the processed data is the result of the output node.

The output node may be used to further process the obtained input parameters, and can be set as needed, for example, format conversion, statistics of results, and the like.

If the current node is not an output node, then return and continue to execute each node in the order of the directed acyclic graph described above.

The data interface processing method provided by the embodiment of the present disclosure, constructs a directed acyclic graph by using the combination relationship between the third-party APIs and the connectors, and sequentially executes third-party APIs and connectors according to the directed acyclic graph. Thereby ensuring that the data is executed in the order of the combination relationship between the third-party APIs and the connectors.

Figure 3:
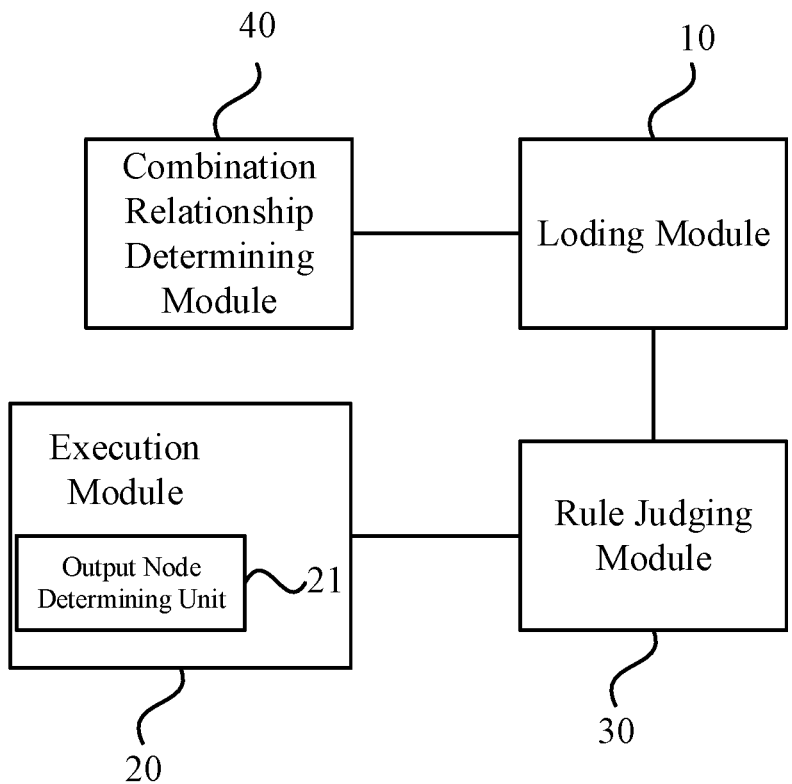
FIG. 3 is a schematic structural diagram of a data interface processing apparatus according to an embodiment.

FIG. 3 is a schematic structural diagram of a Web API processing apparatus according to an embodiment of the present disclosure. Referring to FIG. 3, the Web API processing apparatus provided in this embodiment includes: a loading module 10 and an execution module 20.

The loading module 10 is configured to load a configuration file when the user application is installed, where the configuration file includes a combination relationship between at least one third-party API and at least one connector, and the connector is used to implement data conversion between multiple third-party APIs;

The execution module 20 is configured to obtain, through the user application, the user inputs as input parameters; the user application then converts the input parameters according to the combination relationship defined in the configuration file and outputs the result.

Optionally, the device further includes: a rule judging module 30.

The rule judging module 30 is configured to obtain the combination relationship from the configuration file after loading it; and each of the third-party APIs or the connectors are used as a single node, according to the combination relationship, to construct a directed acyclic graph; determining whether the combined relationship between the third-party APIs and the connectors in the directed acyclic graph satisfies the preset rules.

Optionally, the execution module 20 is specifically configured to:

if the combination relationship between the third-party APIs and the connectors in the directed acyclic graph satisfies preset rules, and the user inputs are obtained through the user application, the inputs are used as input parameters, and each node in the directed acyclic graph is executed in order.

Optionally, the execution module 20 is further configured to:

traverse the directed acyclic graph, starting from the input node, setting the successor nodes of the input node as the current node in sequence, determining whether the current node is a third-party API, or a connector, where the input node is used to check the format of the input parameters;

if it is determined that the current node is a third-party API, then determine, according to the definition of the third-party API's input format in the configuration file, whether the input parameters meet the requirements, and if the inputs meet the requirements, the third-party API is invoked using the input parameters, and the response is obtained as the output result of the current node, which is then used as the input parameters of the successor node, and then the execution continues to the successor node;

if it is determined that the current node is a connector, determining, according to the definition of the input format of the connector in the configuration file, whether the input parameters meet the requirements, and if the input parameters satisfy the requirements, perform data conversion on the input parameters, according to the data conversion rules defined in the connector, and the converted data is the output result of the current node, which is then used as the successor node's input parameters, and then the execution continues to the successor node.

Optionally, the device further includes: an output node determining unit 21.

The output node determining unit 21 is configured to determine whether the current node is an output node after determining whether the current node is a third-party API or a connector, and if the current node is an output node, data processing is performed on the acquired input parameters according to the definition of the output node in the configuration file, and the processed data is used as the output, where the output node is configured to perform data processing on the acquired input parameters.

Optionally, the preset rules include at least one of the following:

the third-party APIs are connected by a connector; and,
the directed acyclic graph begins with the input node, and ends with the output node; and, the input node and the output node are directly connected to a single third-party API, or a plurality of the third-party APIs through a connector; and, the connector is connected to the input node or the output node, and two connectors are not directly connected.

Optionally, the device further includes: a combination relationship determining module 40.

The combination relationship determining module 40 is configured to, before loading the configuration file that includes the combination relationship between at least one third-party API and at least one connector, determine at least one third-party API according to the requirements, and at least one connector according to at least one of: a difference in data format between the third party APIs, and between the requirements, and the connection relationship between the third-party APIs and the connectors is taken as the combination relationship.

The data interface processing apparatus provided by the embodiment of the present disclosure is configured to load a configuration file, which includes a combination relationship between at least one third-party API and at least one connector, and obtains user input, which is then used as input parameters, through the user application; the user application converts the input parameters according to the combination relationship defined in the configuration file to meet the personalized requirements of the user application and finally outputs the result. The combination relationship is set according to the requirements of the user application. At the same time, at least one third-party API's being called avoids the re-development of the corresponding function of the third-party API, which reduces development cost and improves development efficiency.

Figure 4:
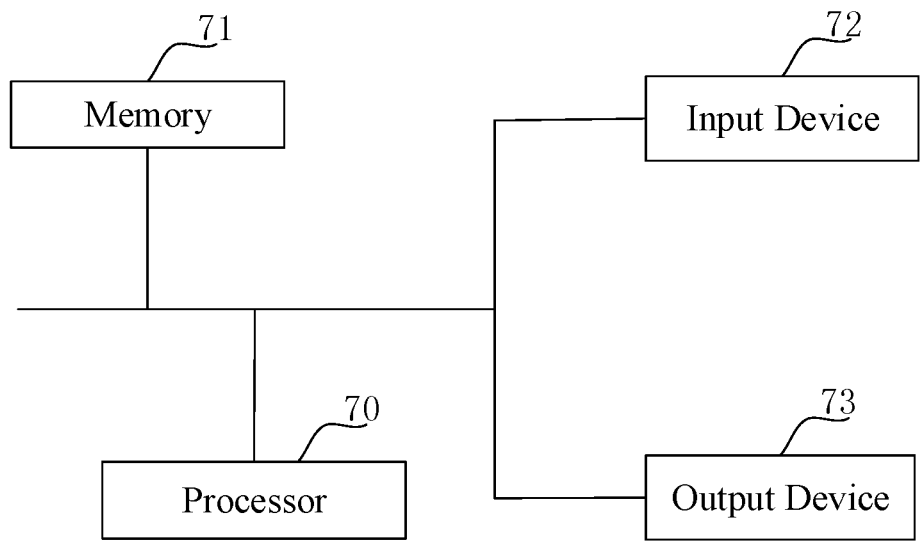
FIG. 4 is a schematic structural diagram of a server according to an embodiment.

FIG. 4 is a schematic structural diagram of a server according to an embodiment of the present disclosure. As shown in FIG. 4, the server includes a processor 70, a memory 71, an input device 72, and an output device 73. The number of processors 70 in the server may be one or more. Take a processor 70 as an example in FIG. 4; the processor 70, the memory 71, the input device 72, and the output device 73 in the server may be connected by a bus or other means, and the bus connection is taken as an example in FIG. 4.

The memory 71 is used as a computer readable storage medium for storing software programs, computer executable programs, and modules, such as program instructions/modules corresponding to the data interface processing method in the embodiment of the present disclosure (for example, the data interface processing device's loading module 10 and execution module 20). The processor 70 executes various functional applications and data processing of the server by executing software programs, instructions, and modules stored in the memory 71. In this way, it implements the above-described data interface processing method.

The memory 71 may mainly include a program storage area and a data storage area, where the program storage area may store an operating system, an application required for at least one function; the data storage area may store data created with the use of the terminal, and the like. Further, the memory 71 may include a high speed random access memory, and may also include a nonvolatile memory such as magnetic disk storage device, flash memory device, or other nonvolatile solid state storage device. In some examples, memory 71 can further include memory remotely located relative to processor 70, which can be connected to the server over a network. Examples of such networks include, but are not limited to, the Internet, intranets, local area networks, mobile communication networks, and combinations of them.

The server provided by the embodiment of the present disclosure, by loading a configuration file, which includes a combination relationship between at least one third-party API and at least one connector, and obtaining user inputs through the user application as input parameters; the user application converts the input parameters according to the combination relationship defined in the configuration file to meet the personalized requirements of the user application and outputs the result. The combination relationship is set according to the requirements of the user application data interface. At the same time, at least one third-party API's being called avoids the developer's repeated development of the corresponding function of the third-party application data interface, which reduces development cost and improves development efficiency.

The embodiment of the present disclosure further provides a storage medium containing computer executable instructions for calling an API when executed by a computer processor, the method includes:

when the user application is installed, the configuration file is loaded, which includes a combination relationship between at least one third-party API and at least one connector, and the connector is used to implement data conversion between the plurality of third-party APIs, The combination relationship is set according to the requirements corresponding to the user application;

obtaining the parameters input by the user through the user application as input parameters;

making the user application to convert the input parameters according to the combination relationship defined in the configuration file and output the result.

Of course, as for the storage medium containing computer executable instructions provided by the embodiment of the present disclosure, the computer executable instructions are not only limited to the methods as described above, but also any data interface processing methods provided by any embodiments of the present disclosure.

Through the above description of the embodiments, those skilled in the art can clearly understand that the present disclosure can be implemented by software and necessary general hardware, and can also be implemented by hardware, but in many cases, the former is a better implementation. Based on such understanding, the technical solution of the present disclosure, which is essential or contributes to the prior art, may be embodied in the form of a software product, which may be stored in a computer readable storage medium, such as a floppy disk of a computer, Read-Only Memory (ROM), Random Access Memory (RAM), Flash (FLASH), hard disk or optical disk, etc., including a number of instructions to make a computer device (can be a personal computer, a server, or network device, etc.) performs the methods described in various embodiments of the present disclosure.

It should be noted that, in the foregoing embodiment of the search apparatus, each unit and module included is only divided according to functional logic, but is not limited to the above division, as long as the corresponding function can be implemented; the specific names of the units are also for convenience of distinguishing from each other and are not intended to limit the scope of the present disclosure.

What is claimed is:

1. A data interface processing method, comprising:
when a user application is installed, loading a configuration file, which comprises a combination relationship between at least one third-party Application Programming Interface and at least one connector, wherein the connector is used to implement data conversion between a plurality of third-party application programming interfaces, and the combination relationship is set according to requirements corresponding to the user application;
obtaining, through the user application, user inputs as input parameters; and
converting, by the user application, the input parameters according to the combination relationship defined in the configuration file and outputting the converted input parameters;
wherein after loading the configuration file, the method further comprises:
obtaining the combination relationship from the configuration file;
constructing a directed acyclic graph according to the combination relationship, using each of the third-party application programming interfaces and the connector as a single node; and
determining that the combination relationship between the third-party application programming interface and the connector in the directed acyclic graph satisfies a preset rule;
wherein converting, by the user application, the input parameters according to the combination relationship defined in the configuration file and outputting the converted input parameters comprises:
based on determining that the combination relationship between the third-party application programming interface and the connector in the directed acyclic graph satisfies the preset rule, and the user inputs are obtained by the user application, using the user inputs as the input parameters, and executing each node in the directed acyclic graph in order according to the directed acyclic graph.

2. The data interface processing method according to claim 1, wherein the executing each node in the directed acyclic graph in order according to the directed acyclic graph, comprises:
traversing the directed acyclic graph, starting from an input node, determining successor nodes of the input node as a current node in sequence, determining that the current node is the third-party application programming interface, or the connector, wherein the input node is used to check a format of the input parameters;
based on determining that the current node is the third-party application programming interface, then determining, according to a definition of an input format of the third-party application programming interface in the configuration file, that the input parameters meet the requirements, and based on determining that the input parameters meet the requirements, invoking the third-party application programming interface using the input parameters, and obtaining a response as an output result of the current node, which is then used as the input parameters of a successor node of the successor nodes, and then continuing the execution to the successor node; and
based on determining that the current node is the connector, then determining, according to the definition of the input format of the connector in the configuration file, that the input parameters meet the requirements, and based on determining that the input parameters satisfy the requirements, performing data conversion on the input parameters, according to data conversion rules defined in the connector, and using the converted data as the output result of the current node, which is then used as the successor node's input parameters, and then continuing the execution to the successor node.

3. The data interface processing method according to claim 2, wherein after the determining that the current node is a third-party application programming interface or a connector, the method further comprises:
   determining that the current node is an output node, and based on determining that the current node is the output node, performing data processing on the input parameters according to a definition of the output node, and using the processed data as a result of the output node.

4. The data interface processing method according to claim 3, wherein the preset rule comprises at least one of the following: the third-party application programming interfaces are connected by the connector; the directed acyclic graph begins with the input node, and ends with the output node; the input node and the output node are directly connected to a single third-party application programming interface, or the third-party application programming interfaces through the connector; and the connector is connected to the input node or the output node, and two connectors are not directly connected.

5. The data interface processing method according to claim 3, wherein before the loading the configuration file, the method further comprises:
   determining at least one third-party application programming interface according to the requirements;
   determining at least one connector according to at least one of the following: a difference in data format between the third-party application programming interfaces, and between the requirements; and
   taking the connection relationship between the third-party application programming interfaces and the connector as the combined relationship.

6. The data interface processing method according to claim 2, wherein the preset rule comprises at least one of the following: the third-party application programming interfaces are connected by the connector; the directed acyclic graph begins with the input node, and ends with an output node; the input node and the output node are directly connected to a single third-party application programming interface, or the third-party application programming interfaces through the connector; and the connector is connected to the input node or the output node, and two connectors are not directly connected.

7. The data interface processing method according to claim 2, wherein before the loading the configuration file, the method further comprises:
   determining at least one third-party application programming interface according to the requirements;
   determining at least one connector according to at least one of the following: a difference in data format between the third-party application programming interfaces, and between the requirements; and
   taking the connection relationship between the third-party application programming interfaces and the connector as the combined relationship.

8. The data interface processing method according to claim 1, wherein the preset rule comprises at least one of the following: the third-party application programming interfaces are connected by the connector; the directed acyclic graph begins with an input node, and ends with an output node; the input node and the output node are directly connected to a single third-party application programming interface, or the third-party application programming interfaces through the connector; and the connector is connected to the input node or the output node, and two connectors are not directly connected.

9. The data interface processing method according to claim 1, wherein before the loading the configuration file, the method further comprises:
   determining at least one third-party application programming interface according to the requirements;
   determining at least one connector according to at least one of the following: a difference in data format between the third-party application programming interfaces, and between the requirements; and
   taking the connection relationship between the third-party application programming interfaces and the connector as the combined relationship.

10. The data interface processing method according to claim 1, wherein before the loading the configuration file, the method further comprises:
    determining at least one third-party application programming interface according to the requirements;
    determining at least one connector according to at least one of the following: a difference in data format between the third-party application programming interfaces, and between the requirements; and
    taking the connection relationship between the third-party application programming interfaces and the connector as the combined relationship.

11. The data interface processing method according to claim 1, wherein before the loading the configuration file, the method further comprises:
    determining at least one third-party application programming interface according to the requirements;
    determining at least one connector according to at least one of the following: a difference in data format between the third-party application programming interfaces, and between the requirements; and
    taking the connection relationship between the third-party application programming interfaces and the connector as the combined relationship.

12. A server, comprising:
    at least one processor; and
    a storage device storing at least one program;
    wherein when executed by the at least one processor, the at least one program causes the at least one processor to perform:
    when a user application is installed, loading a configuration file, which comprises a combination relationship between at least one third-party Application Programming Interface and at least one connector, wherein the connector is used to implement data conversion between a plurality of third-party application programming interfaces, and the combination relationship is set according to requirements corresponding to the user application;
    obtaining, through the user application, user inputs as input parameters; and
    converting, by the user application, the input parameters according to the combination relationship defined in the configuration file and outputting the converted input parameters;
    wherein after loading the configuration file, the server implements a method comprising:
    obtaining the combination relationship from the configuration file;

constructing a directed acyclic graph according to the combination relationship, using each of the third-party application programming interfaces and the connector as a single node; and determining whether the combination relationship between the third-party application programming interface and the connector in the directed acyclic graph satisfies a preset rule;

wherein converting, by the user application, the input parameters according to the combination relationship defined in the configuration file and outputting the converted input parameters comprises:

when the combination relationship between the third-party application programming interface and the connector in the directed acyclic graph satisfies the preset rule, and the user inputs are obtained by the user application, using the user inputs as the input parameters, and executing each node in the directed acyclic graph in order according to the directed acyclic graph.

13. The server according to claim 12, wherein when executed by the at least one processor, the at least one program causes the at least one processor to further perform:

traversing the directed acyclic graph, starting from an input node, determining successor nodes of the input node as a current node in sequence, determining that the current node is the third-party application programming interface, or the connector, wherein the input node is used to check a format of the input parameters;

based on determining that the current node is the third-party application programming interface, then determining, according to a definition of an input format of the third-party application programming interface in the configuration file, that the input parameters meet the requirements, and based on determining that the input parameters meet the requirements, invoking the third-party application programming interface using the input parameters, and obtaining a response as an output result of the current node, which is then used as the input parameters of a successor node of the successor nodes, and then continuing the execution to the successor node; and based on determining that the current node is the connector, then determining, according to the definition of the input format of the connector in the configuration file, that the input parameters meet the requirements, and based on determining that the input parameters satisfy the requirements, performing data conversion on the input parameters, according to data conversion rules defined in the connector, and using the converted data as the output result of the current node, which is then used as the successor node's input parameters, and then continuing the execution to the successor node.

14. The server according to claim 13, wherein when executed by the at least one processor, the at least one program causes the at least one processor to further perform:

determining whether the current node is an output node, and when the current node is the output node, performing data processing on the input parameter according to the definition of the output node, and using the processed data as the result of the output node.

15. A non-transitory computer storage medium, which stores computer programs;

wherein when executed by a processor, the computer programs perform the following steps:

when a user application is installed, loading a configuration file, which comprises a combination relationship between at least one third-party Application Programming Interface and at least one connector, wherein the connector is used to implement data conversion between a plurality of third-party application programming interfaces, and the combination relationship is set according to requirements corresponding to the user application;

obtaining, through the user application, user inputs as input parameters; and converting, by the user application, the input parameters according to the combination relationship defined in the configuration file and outputting the converted input parameters;

wherein after loading the configuration file, the computer programs further perform the following steps:

obtaining the combination relationship from the configuration file;

constructing a directed acyclic graph according to the combination relationship, using each of the third-party application programming interfaces and the connector as a single node; and determining whether the combination relationship between the third-party application programming interface and the connector in the directed acyclic graph satisfies a preset rule;

wherein the computer programs perform the converting, by the user application, the input parameters according to the combination relationship defined in the configuration file and outputting the converted input parameters by:

when the combination relationship between the third-party application programming interface and the connector in the directed acyclic graph satisfies the preset rule, and the user inputs are obtained by the user application, using the user inputs as the input parameters, and executing each node in the directed acyclic graph in order according to the directed acyclic graph.

* * * * *